United States Patent
Butler

(10) Patent No.: US 7,503,761 B2
(45) Date of Patent: Mar. 17, 2009

(54) METHOD FOR REDUCING THE FORMATION OF NITROGEN OXIDES IN STEAM GENERATION

(75) Inventor: James R. Butler, Friendswood, TX (US)

(73) Assignee: Fina Technology Inc., Houston, TX (US)

( * ) Notice: Subject to any disclaimer, the term of this patent is extended or adjusted under 35 U.S.C. 154(b) by 427 days.

(21) Appl. No.: 11/149,583

(22) Filed: Jun. 10, 2005

(65) Prior Publication Data

US 2005/0223643 A1    Oct. 13, 2005

(51) Int. Cl.
*F23D 14/16* (2006.01)
(52) U.S. Cl. .................... 431/7; 431/326; 431/328; 126/91 A; 122/4 D
(58) Field of Classification Search ............ 431/2, 431/7, 11, 12, 215, 75, 76, 207, 326, 328; 126/91 A; 122/4 D
See application file for complete search history.

(56) References Cited

U.S. PATENT DOCUMENTS

| 3,113,623 | A | * | 12/1963 | Krueger | 166/59 |
|---|---|---|---|---|---|
| 3,425,675 | A | * | 2/1969 | Twine | 432/199 |
| 3,688,760 | A | * | 9/1972 | Rudin | 126/91 A |
| 3,928,961 | A | * | 12/1975 | Pfefferle | 60/777 |
| 4,321,131 | A | * | 3/1982 | Lowe | 208/130 |
| 4,493,308 | A | * | 1/1985 | Hurley et al. | 126/41 R |
| 4,730,599 | A | * | 3/1988 | Kendall et al. | 126/91 A |
| 4,899,696 | A | * | 2/1990 | Kennedy et al. | 122/135.1 |
| 5,255,742 | A | * | 10/1993 | Mikus | 166/303 |
| 5,271,827 | A | * | 12/1993 | Woebcke | 208/132 |
| 5,297,626 | A | * | 3/1994 | Vinegar et al. | 166/271 |
| 5,392,854 | A | * | 2/1995 | Vinegar et al. | 166/271 |
| 5,404,952 | A | * | 4/1995 | Vinegar et al. | 166/303 |
| RE35,696 | E | * | 12/1997 | Mikus | 166/303 |
| 5,731,485 | A | * | 3/1998 | Crowe et al. | 585/401 |
| 6,062,210 | A | * | 5/2000 | Welles | 126/208 |
| 6,274,101 | B1 | * | 8/2001 | Sechrist | 422/198 |
| 6,763,886 | B2 | * | 7/2004 | Schoeling et al. | 166/302 |
| 7,025,940 | B2 | * | 4/2006 | Shah et al. | 422/198 |
| 2003/0182858 | A1 | * | 10/2003 | Shah et al. | 48/127.9 |

FOREIGN PATENT DOCUMENTS

| EP | 000622587 A2 | * | 11/1994 |
|---|---|---|---|
| EP | 1021682 | * | 3/2002 |
| EP | 1021682 B1 |  | 3/2002 |
| JP | 57-47119 | * | 3/1982 |
| JP | 02-52913 | * | 2/1990 |
| JP | 02-178516 | * | 2/1990 |
| WO | WO99/18392 |  | 4/1999 |
| WO | WO 99/18392 | * | 4/1999 |

\* cited by examiner

*Primary Examiner*—Carl D Price

(57) ABSTRACT

Disclosed herein is a method for generating steam, comprising oxidizing a fuel to generate heat via a flameless reaction; and using the heat generated via the reaction to convert water to steam. In an embodiment, the amount of $NO_x$ present is flue gas from the reaction is less than about 10 PPMv. In an embodiment, the reaction temperature is less than about 2600° F. (1430° C.). In an embodiment, the method further comprises controlling the reaction temperature to minimize the formation of $NO_x$. In an embodiment, controlling the reaction temperature further comprises sensing one or more process variables and adjusting a process controller in response to the sensed process variable. Also disclosed herein is a steam generator comprising a reaction zone wherein fuel is oxidized to generate heat via a flameless reaction and a heating zone wherein water is converted to steam via heat from the reaction.

11 Claims, 2 Drawing Sheets

METHOD FOR REDUCING THE FORMATION OF NITROGEN OXIDES IN STEAM GENERATION

CROSS-REFERENCE TO RELATED APPLICATIONS

This Application claims priority from U.S. patent application having Ser. No. 10/738,346, filed Dec. 17, 2003, which claims priority from U.S. Provisional Patent Application having Ser. No. 60/435,503, filed Dec. 20, 2002.

FIELD OF THE INVENTION

The present application relates to a method for steam generation.

BACKGROUND OF THE INVENTION

Steam is useful in a variety of industrial applications such as petroleum or chemical plants. Traditionally, stream is produced using a boiler, wherein a fuel is combusted to supply the heat needed to convert water to steam. Environmental regulations require reduced emissions of nitrogen oxides ($NO_x$), such as nitric oxide (NO) and nitrogen dioxide ($NO_2$), from combustion processes and equipment such as steam boilers. Thus, a need exists for improved combustion processes and equipment that reduces the amount of $NO_x$ emissions in the flue gas, especially to ultra-low levels below about 10 parts per million by volume (PPMv).

SUMMARY OF THE INVENTION

Disclosed herein is a method for generating steam, comprising oxidizing a fuel to generate heat via a flameless reaction; and using the heat generated via the reaction to convert water to steam. In an embodiment, the amount of $NO_x$ present is flue gas from the reaction is less than about 10 PPMv. In an embodiment, the reaction temperature is less than about 2600° F. (1430° C.). In an embodiment, the method further comprises controlling the reaction temperature to minimize the formation of $NO_x$. In an embodiment, controlling the reaction temperature further comprises sensing one or more process variables and adjusting a process controller in response to the sensed process variable.

Also disclosed herein is a steam generator comprising a reaction zone wherein fuel is oxidized to generate heat via a flameless reaction and a heating zone wherein water is converted to steam via heat from the reaction In an embodiment, the steam generator further comprises a means for controlling the reaction temperature to minimize the formation of $NO_x$.

DETAILED DESCRIPTION OF THE PREFERRED EMBODIMENTS

Description of Heater

Figure 1:
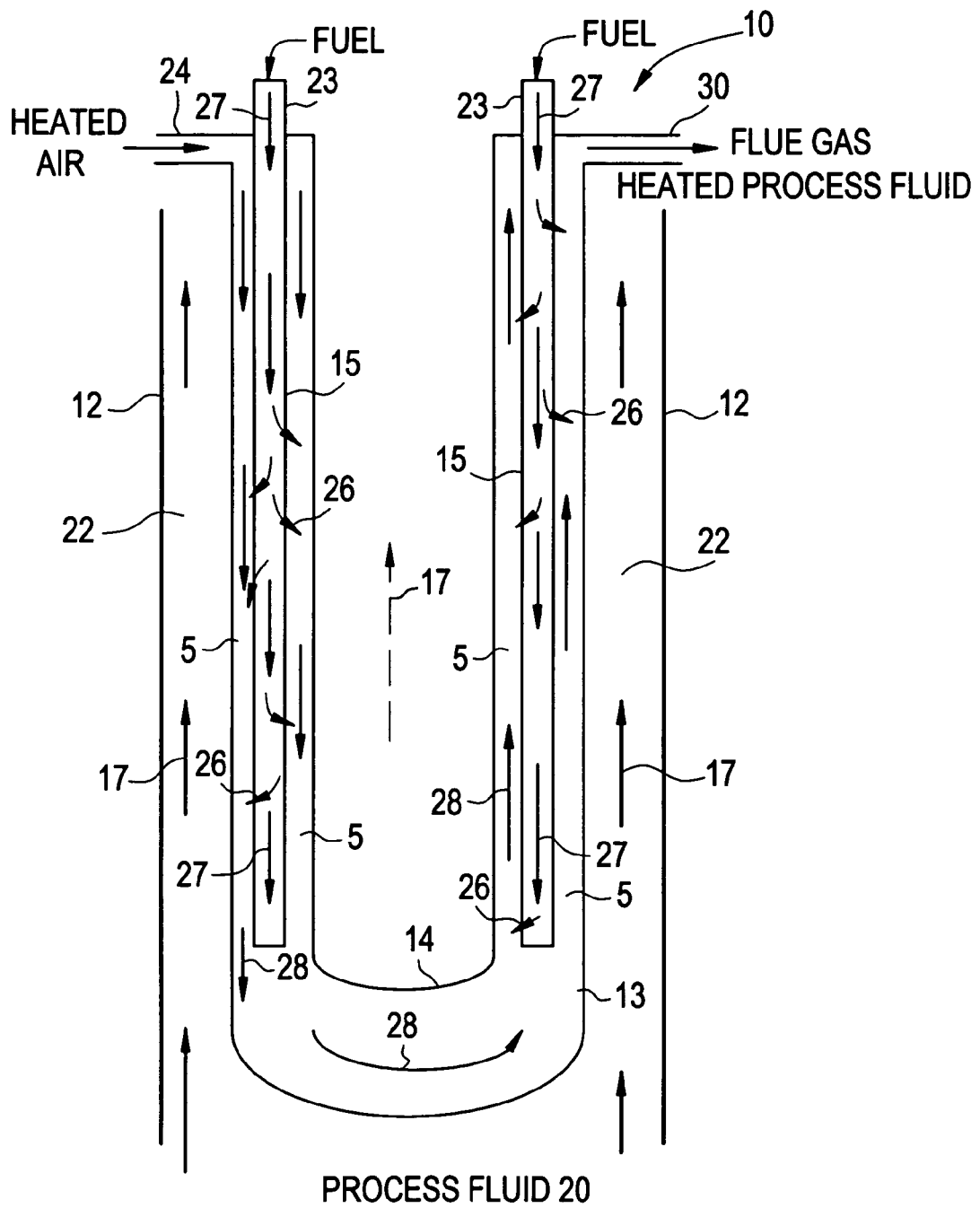
FIG. 1 is a cross-section diagram of a flameless distributed combustion heater.

Referring to FIG. 1, flameless distributed combustion (FDC) heater 10 is in contact with a process fluid 20. Heater 10 includes a fuel distribution system for distributing and metering a fuel within the heater for a flameless oxidation reaction, for example one or more porous tubes 15, pipes, or other structurally defined flow passageways, channels, and the like. Porous tubes 15 include openings or passages (i.e., pores) for the metering of fuel, and the number, size, and arrangement of the pores may vary to achieve desired fuel metering. Heater 10 further comprises one or more reaction zones 5 in communication with the fuel distribution system (e.g., porous tubes) and configured for receipt of and flameless oxidation of the fuel therein. In an embodiment, an oxidation catalyst may be disposed within the reaction zone for catalyzing the flameless oxidation reaction. Heater 10 further includes one or more heating zones 22 wherein a process fluid is heated via heat generated from the oxidation reaction. The heating zones 22 may be integral with the heater body (i.e., the process fluid passes through the heater within walls 12), or located adjacent to the heater in embodiments where the heater is placed directly in a process stream or vessel within walls 12.

In the embodiment shown in FIG. 1, the reaction zone and fuel distribution system are arranged in a shell and tube configuration, respectively, wherein a plurality of porous tubes 15 are disposed within a reaction zone defined by outer shell wall 13 and inner shell wall 14. Alternatively, the reaction zone and fuel distribution system may be arranged in a tube within a tube (e.g., concentric, offset, etc.) configuration, respectively, wherein a plurality of porous inner tubes 15 are disposed within a reaction zone defined by outer tube walls 13 and 14. The porous tubes may support one or more oxidation catalysts on their outer surface. In an embodiment, the heating zone is integrated into the heater as shown by walls 12 with the process fluid 20 flowing through the body of the heater as represented by arrows 17. Dashed arrow 17 represents that the heater may be configured to allow process fluid 20 to flow in interior portions of a shell and/or tube configuration. Furthermore, the flow of process fluid 20 may be concurrent, countercurrent, or crosscurrent with the flow of components (e.g., reactants such as fuel and air and reaction products such as flue gas) to and from the oxidation reaction. In such an embodiment, the walls 12 include an outer shell enclosing the inner shell or concentric tubes comprising the fuel distribution system and reaction zone. In an alternative embodiment, walls 12 define a process stream or tank, wherein the heater is disposed therein.

The heater may include a preheat zone, wherein one or more reactants such as air is preheated prior to entering the reaction zone. For example, flue gas produced from the reaction may be used to preheat the air in a preheat zone. In an embodiment, the preheat zone is integrated within a shell and tube heater, for example by placing the preheat zone upstream of the reaction zone and using flue gas produced via the reaction to preheat one or more reactants as they flow from the preheat zone to the reaction zone. The heater may include one or more sensors, for example a $NO_x$ and/or temperature sensor in flue gas outlet 30, and such sensors may be coupled to one or more process controllers to control operation of the heater. The fuel distribution system, reaction zone, and heating zones may have alternative structural configurations, for example a plate type heater wherein a plurality of shaped and/or porous plates form the fuel distribution system and one or more reaction zones. Examples of various FDC heater structural configurations are shown shell and/or tube configurations in U.S. Pat. Nos. 5,255,742; 5,297,626; 5,392,854; and 5,404,952; and for plate-type configurations in U.S. Pat. No. 6,274,101, each of which is incorporated herein by reference in its entirety.

Description of Heater Operation

Flameless oxidation of the fuel in heater 10 generates heat, which is transferred to and heats the process fluid. More specifically, fuel is fed into the fuel distribution system by one or more inlets 23 and subsequently travels through the fuel distribution system as shown by arrows 27. An oxidizer such as air is preheated in a preheater (not shown) to greater than the auto-ignition temperature of the fuel and fed to the combustion chambers via inlet 24. A fuel's auto-ignition temperature (AIT) is the temperature at which the fuel self-ignites in the presence of the oxidizer (e.g., air) without an external source of ignition, such as a spark or flame. During startup of the heater, the oxidizer is preheated via an external heat source since heat from the oxidation reaction is not yet available to preheat the reactants and drive the reaction. Within the reaction zone, the fuel mixes with the preheated air by passing or diffusing through the walls of the fuel distribution system (e.g., porous tubes 15), and the fuel undergoes flameless oxidation upon contact with the oxidizer, that is the direct oxidation without a flame or flamefront being generated. Upon initiation of the oxidation reaction (i.e., light-off of the heater), the reactants (e.g., air) may be heated to greater than the auto-ignition temperature using heat produced via the reaction, thus creating an autothermal reaction that may be self sustained.

Typically, the pressure in the fuel distribution system is greater than the pressure in the reaction zone, thereby creating a pressure differential that drives the diffusion of fuel into the reaction zone as shown by arrows 26. The pressure in the fuel distribution system may be increased or decreased, for example using a process controller, to regulate the amount of fuel fed to the reaction zone, which in turn controls the amount of heat generated by the heater. When present, the oxidation catalyst disposed within the reaction zone catalyzes the flameless oxidation of the fuel. The oxidation of the fuel heats the surfaces of the heater that are in contact with the process fluid (e.g., the reaction chamber walls such as shell walls 13 and/or 14), and heat is exchanged between the surfaces and the process fluid according to known heat transfer means and technology. Flue gas comprising reaction products (e.g., CO, $CO_2$, $H_2O$) and unreacted fuel and oxidizer circulate through the heater as shown by arrows 28 and exits via outlet 30.

The oxidizer may be oxygen, air, oxygen-enriched air, oxygen mixed with an inert gas (i.e., diluent), and the like. Suitable oxidization catalysts are known in the art, for example metal catalysts such as platinum or palladium. The fuel may be hydrogen, one or more hydrocarbons, or combinations thereof. Typically, the fuel contains a minimal amount of nitrogen chemically bound in the fuel, thereby further minimizing the amount of nitrogen available to form $NO_x$. The fuel may be gas and/or vaporizable liquid, with the fuel distribution system being configured (e.g., tube porosity, that is the size and number of pores in the tubes, which may be controlled by the manufacturing process and/or materials selected) to allow diffusion of the fuel into the reaction zone based upon the particular fuel to be used in the heater. In an embodiment, the fuel is gaseous hydrocarbons comprising from about 1 to 4 carbon atoms. In an embodiment, the fuel further comprises hydrogen. In another embodiment, the fuel consists essentially of methane.

Description of Heater Operation to Minimize $NO_x$

Thermal $NO_x$ and fuel $NO_x$ account for the majority of $NO_x$ formed during the combustion of fossil fuels. Thermal $NO_x$ is formed by the oxidation of molecular nitrogen in the combustion air. Formation of thermal $NO_x$ is temperature dependent, with greater amount of thermal $NO_x$ being formed at higher temperatures, especially temperatures greater than about 2600-2800° F. (1430-1540° C.) wherein $NO_x$ formation may begin to increase exponentially. Fuel $NO_x$ is formed by the oxidation of nitrogen chemically bound within the fuel. Formation of fuel $NO_x$ is oxygen concentration dependent (in relationship of a perfect stoichiometric ratio), with $NO_x$ formation the highest at fuel-to-air combustion ratios producing about 5-7% $O_2$ in the flue gas (25-45% excess air). Lower excess air levels starve the fuel $NO_x$ reaction for oxygen, and higher excess air levels drive down the flame temperature, slowing the rate of the fuel $NO_x$ reaction.

In an embodiment, the heater is operated in a manner to minimize the formation of $NO_x$ during combustion of the fuel, for example to achieve what is referred to in industry as ultra low $NO_x$ formation. For example, the temperature within the reaction zone of the heater (i.e., reaction temperature) may be controlled to minimize the formation of $NO_x$. In an embodiment, the flue gas comprises less than about 10 PPMv of $NO_x$, alternatively less than about 5 PPMv of $NO_x$, and alternatively less than about 3 PPMv of $NO_x$. In an embodiment, the reaction temperature is controlled to remain less than about 2600° F. (1430° C.), which is about the temperature of a burner flamefront as well as about the temperature at which $NO_x$ begins to form at an exponential rate. In another embodiment, the reaction temperature is controlled to remain substantially less than 2600° F. (1430° C.). In another embodiment, the reaction temperature is controlled to remain less than about 1600° F. (871° C.). At a reaction temperature of less than about 1600° F. (871° C.), many fuels having an AIT of less than 1600° F. (871° C.) in air are available. Furthermore, at less than about 1600° F. (871° C.), conventional materials such as grade 304 steel may be used to construct the heater components (e.g., reaction zone, fuel distribution system, etc.) rather than more expensive materials having a higher heat tolerance. In another embodiment, the reaction temperature is controlled to remain less than about 1500° F. (816° C.).

In an embodiment, the target temperature or temperature range for a heated process stream is provided. Other process variables such as pressure, phase, and flow rate may also be provided for the heated process stream. For example, the heated process stream may be steam having a desired temperature and pressure (e.g., superheated steam). For an available fuel and oxidizer type and concentration, the AIT of the fuel is determined. The reaction is lit-off by heating the oxidizer to greater than the AIT of the fuel, and subsequently introducing fuel to the heated oxidizer. In order for the oxidation reaction to continue, the reaction temperature is controlled such that it remains about equal to or greater than the AIT of the fuel, otherwise the oxidation reaction would terminate. In order to provide a buffer for temperature fluctuations, the reaction temperature may be controlled to remain at about a set point (i.e., tolerance) greater than the fuel AIT, for example about 25, 50, 75, 100° F. (−4, 10, 24, 38° C.) or greater above the fuel AIT. In an embodiment, the reaction temperature is controlled such that the difference between the reaction temperature and the AIT of the fuel is minimized within a given tolerance, e.g., about 25, 50, 75, 100° F. or greater (−4, 10, 24, 38° C.). In an embodiment, the reaction temperature is controlled such that it remains about equal to or greater than the AIT of the fuel and less than about 1600° F. (871° C.), alternatively less than about 1500° F. (816° C.).

The reaction temperature may be controlled by equipment configuration such as heater sizing, porosity (size and number of pores) of the fuel distribution system, etc.; adjusting one or more process variables such as reactant (e.g., fuel and/or oxidizer) flow rates, pressures, concentrations, ratios, etc.; and/or by use of one or more oxidation catalysts. One or more of the process variables affecting the combustion temperature may be computer controlled, for example via a feedback loop between a sensor and a process controller such as a flow controller, pressure controller, etc. In an embodiment, a temperature controller is coupled to a flue gas $NO_x$ sensor, allowing computerized feedback control of one or more process variables to control the temperature. In an embodiment, the reaction temperature is controlled by adjusting the fuel pressure, which in turn adjusts the amount of fuel being fed to the reaction.

The type and amount of oxidation catalyst may be selected and/or adjusted to assist in the control of the reaction temperature. In an embodiment, the presence of an oxidation catalyst lowers the reaction temperature in comparison to similar reaction conditions with no oxidation catalyst present. The amount of oxidizer present in the reaction zone (i.e., the molar ratio of oxygen to fuel) may be selected and/or adjusted to assist in the control of the reaction temperature. In an embodiment, an increase in the molar ratio of oxygen to fuel lowers the AIT of the fuel in comparison to similar reaction conditions with a lower molar ratio of oxygen to fuel, thereby allowing the reaction temperature to be likewise reduced. Such an embodiment might be temporarily used during start up of the heater, with a subsequent shift to lower oxygen to fuel ratios. For example, oxygen enriched are may be used to start the heater at a lower temperature, with a gradual switch to air as temperatures increase.

Typically, a temperature gradient exists with higher temperatures at or near the outer surface of the fuel distribution system (referred to as the skin temperature, which typically is about equal to the reaction temperature) and decreasing temperatures at increasing distances from the outer surface. In an embodiment, the skin temperature is controlled to minimize coke formation on the outer surface of the fuel distribution system, for example by controlling the skin temperature to about less than the coking temperature of the fuel. Formation of coke may be further minimized by adding steam to the fuel prior to introduction into the reaction zone. In an embodiment, about 0.1 to about 0.2 weight percent steam is added to the fuel prior to the fuel being introduced into the reaction zone. In an embodiment, the oxidation catalyst is present at or near the outer surface of the fuel distribution system, thereby lowering the skin temperature thereof required to maintain the oxidation reaction. In an embodiment, the flow of reactants through the combustion chamber is selected to assist with heat transfer to the process fluid, for example by maintaining turbulent rather than laminar flow across the outer surface of the fuel distribution system.

The heater 10 may be used to heat a process fluid, for example a feed, intermediate, or product stream within a manufacturing facility such as a chemical plant or petroleum refinery. For example, the process heater 10 may be disposed within a process flow line or process vessel such as a tank as defined by walls 12, or alternatively the process fluid may be passed through the heater as defined by walls 12. In an embodiment, the heater is used as a process heater in a hydrotreater. In an embodiment, the heater is used as a reboiler in a distillation column. In an embodiment, the heather is used to heat a process stream in a reformer, for example between catalyst beds. The process fluid may be a solid, semi-solid, liquid, or gas, and the heater is configured for heat exchange with the physical state of the process fluid according to known heat exchange technology. In an embodiment, the process fluid does not chemically react upon being heated, and thus the heating zone does not function as a reaction zone. In an embodiment, the process fluid chemically reacts upon being heated, and thus the heating zone also functions as a reaction zone. In an embodiment, the process fluid is crude oil being distilled in a petroleum refinery, for example preheating crude oil for distillation in a crude tower.

In a steam boiler embodiment, the process fluid is water, which is converted to steam by contact with heater 10. The water may optionally include additives such as anti-scale additives. In an embodiment, steam is produced at a temperature greater than about 400° F. (204° C.), alternatively greater than about 500° F. (260° C.). In an embodiment, a portion of the steam generated is recycled and combined with the fuel prior to oxidation of the fuel to reduce coking of the fuel. In an embodiment, the steam boiler is employed within a petroleum refinery and the steam is used in a hydrocarbon cracking process, to power a steam turbine, to heat a process stream, or combinations thereof. In an embodiment, the steam is used to facilitate heat transfer at another location, for example via a steam jacket or increasing the temperature of a heating fluid such as a heating oil or antifreeze. In an embodiment, light off gas comprising, or alternatively consisting essentially of, hydrocarbons having less than about 4 carbon atoms from one or more petroleum refining processes is used as a fuel to the heater.

Figure 2:
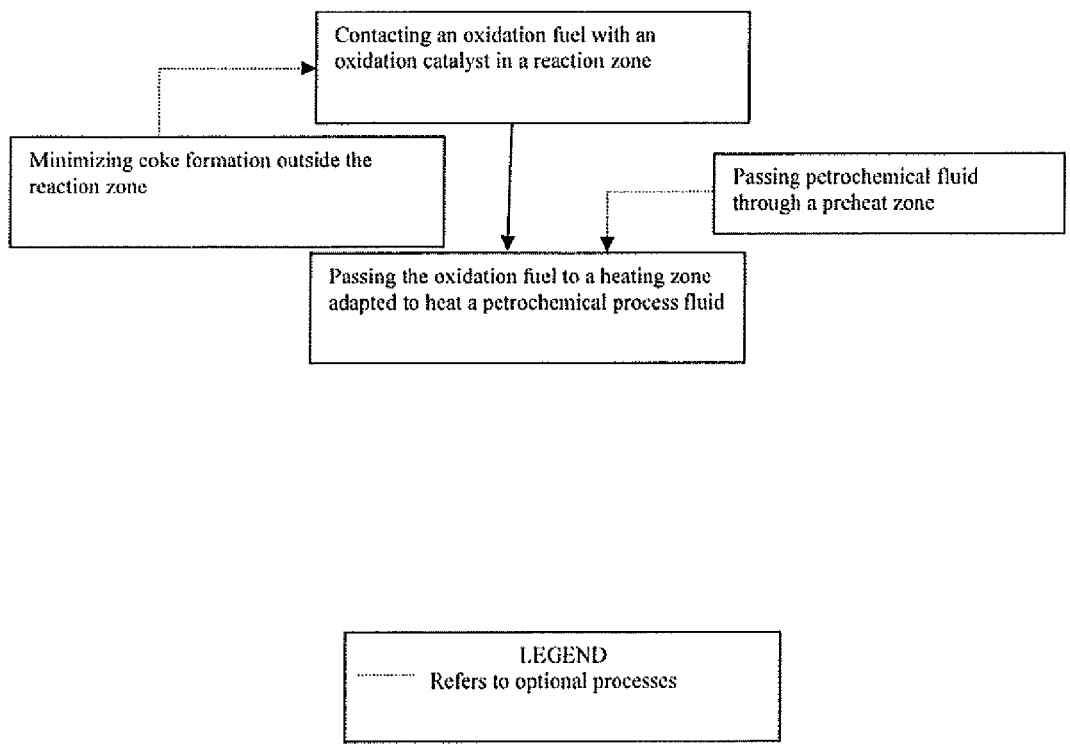
FIG. 2 illustrates methods for minimizing nitrogen oxide formation in petrochemical processes.

FIG. 2 illustrates a method for minimizing nitrogen oxide formation in petrochemical processes. The method generally includes contacting an oxidation fuel with an oxidation catalyst in a reaction zone resulting in flameless combustion of the oxidation fuel, wherein the flameless combustion is conducted at a temperature that is greater than an auto ignition temperature of the oxidation fuel and within a tolerance of less than about 100° F. of the auto ignition temperature, passing the oxidation fuel to a heating zone and heating a petrochemical process fluid, wherein the flameless combustion produces less than 10 ppm of $NO_x$.

FIG. 2 further illustrates optional processes which include contacting the petrochemical process fluid in the preheat zone with a flue gas produced in the reaction zone and minimizing coke formation outside the reaction zone via processes other than flameless combustion.

While the preferred embodiments and examples of the invention have been shown and described, modifications thereof can be made by one skilled in the art without departing from the spirit and teachings of the invention. Heater design criteria (including sizing, selection of construction materials, and fabrication), pendant processing equipment, and the like for any given implementation of the invention will be readily ascertainable to one of skill in the art based upon the disclosure herein. The embodiments and examples described herein are provided for illustration and are not intended to be limiting. Many variations and modifications of the invention disclosed herein are possible and are within the scope of the invention. Accordingly, the scope of protection is not limited by the description set out above, but is only limited by the claims which follow, that scope including all equivalents of the subject matter of the claims.

I claim:

1. A method for minimizing nitrogen oxide formation in petrochemical processes comprising:

contacting an oxidation fuel with an oxidation catalyst in a reaction zone resulting in flameless combustion of the oxidation fuel, wherein the flameless combustion is conducted at a temperature that is greater than an auto ignition temperature of the oxidation fuel and within a tolerance of less than about 100° F. of the auto ignition temperature;

passing the oxidation fuel to a heating zone; and heating a petrochemical process fluid, wherein the flameless combustion produces less than 10 ppm of $NO_x$.

2. The method of claim 1, wherein heating the petrochemical process fluid results in a phase change of the fluid.

3. The method of claim 1, wherein the tolerance is less than about 50° F.

4. The method of claim 1, wherein the tolerance is less than about 25° F.

5. The method of claim 1 further comprising passing the petrochemical process fluid through a preheat zone prior to the heating zone.

6. The method of claim 5 further comprising contacting the petrochemical process fluid in the preheat zone with a flue gas produced in the reaction zone.

7. The method of claim 1, wherein the oxidation fuel is essentially free of nitrogen.

8. The method of claim 1 further comprising minimizing coke formation via processes other than flameless combustion.

9. The method of claim 1 further comprising monitoring a flue gas $NO_x$ sensor in operable communication with a feedback control loop and adjusting process variables in response to sensor readings to minimize $NO_x$ formation.

10. The method of claim 1, wherein the flameless combustion produces less than 3 ppm of $NO_x$.

11. The method of claim 1, wherein the flameless combustion reaction temperature is less than about 1500° F.

* * * * *